United States Patent
Tachi et al.

(10) Patent No.: US 7,961,182 B2
(45) Date of Patent: Jun. 14, 2011

(54) STEREOSCOPIC IMAGE DISPLAY METHOD

(75) Inventors: Susumu Tachi, Tokyo (JP); Tomohiro Endo, Nagoya (JP); Naoki Kawakami, Tokyo (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 823 days.

(21) Appl. No.: 11/722,846

(22) PCT Filed: Jun. 27, 2005

(86) PCT No.: PCT/JP2005/011738
§ 371 (c)(1),
(2), (4) Date: Aug. 17, 2007

(87) PCT Pub. No.: WO2006/070499
PCT Pub. Date: Jul. 6, 2006

(65) Prior Publication Data
US 2008/0043014 A1 Feb. 21, 2008

(30) Foreign Application Priority Data
Dec. 28, 2004 (JP) .................................. 2004-381985

(51) Int. Cl.
*G06T 15/00* (2011.01)
(52) U.S. Cl. .............. 345/419; 345/6; 345/633; 348/40; 348/42; 348/51; 348/56; 359/462; 359/475; 359/477
(58) Field of Classification Search .................. 359/443, 359/466–477; 348/51–60
See application file for complete search history.

(56) References Cited

U.S. PATENT DOCUMENTS

| | | | | |
|---|---|---|---|---|
| 3,815,979 A | * | 6/1974 | Collender | 352/38 |
| 4,089,597 A | * | 5/1978 | Collender | 352/53 |
| 4,158,487 A | * | 6/1979 | Collender | 352/38 |

(Continued)

FOREIGN PATENT DOCUMENTS

JP     10-097013     4/1998

(Continued)

OTHER PUBLICATIONS

Yendo, Tomohiro; Kawakami, Naoki; Tachi Susumu; "Seelinder: the cylindrical lightfield display", Proceeding SIGGRAPH '05 ACM SIGGRAPH 2005 Emerging technologies , 2005.*

Cylindrical Real-time 3-D Display with Scanned 1-D Light Array, Tomohiro Endo et al., (1999), English abstract included.

(Continued)

*Primary Examiner* — Xiao M Wu
*Assistant Examiner* — Phi Hoang
(74) *Attorney, Agent, or Firm* — Rankin, Hill & Clark LLP (57) ABSTRACT

A stereoscopic image display method capable of stereoscopic display of a photographed image. One two-dimensional image is selected, and one pixel capable of being viewed from a corresponding viewpoint position is selected from a plurality of pixels. A virtual surface with the selected two-dimensional image pasted thereon is assumed, and the virtual surface is arranged so that an image center point of the two-dimensional image corresponding to a center of an object coincides with a center of a display surface. Next, a virtual extension that extends from the viewpoint position to the virtual surface through the selected pixel is assumed. A color on the two-dimensional image assumed to have been pasted on the virtual surface, corresponding to a point of intersection between the virtual extension and the virtual surface is determined as a display color of the pixel positioned in a direction extending from the pixel to the viewpoint position.

9 Claims, 4 Drawing Sheets

U.S. PATENT DOCUMENTS

| | | | | |
|---|---|---|---|---|
| 4,367,486 | A * | 1/1983 | Eichenlaub | 348/42 |
| 5,943,166 | A * | 8/1999 | Hoshi et al. | 359/475 |
| 6,118,584 | A * | 9/2000 | Van Berkel et al. | 359/463 |
| 6,476,812 | B1 * | 11/2002 | Yoshigahara et al. | 345/427 |
| 7,277,121 | B2 * | 10/2007 | Mashitani et al. | 348/51 |
| 2003/0086167 | A1 * | 5/2003 | Sonehara | 359/471 |
| 2003/0210461 | A1 * | 11/2003 | Ashizaki et al. | 359/443 |
| 2004/0032407 | A1 * | 2/2004 | Ejiri et al. | 345/419 |
| 2004/0165263 | A1 * | 8/2004 | Sudo et al. | 359/462 |
| 2004/0207726 | A1 * | 10/2004 | McCutchen | 348/46 |
| 2006/0072020 | A1 * | 4/2006 | McCutchen | 348/218.1 |
| 2007/0247519 | A1 * | 10/2007 | Riaziat et al. | 348/37 |

FOREIGN PATENT DOCUMENTS

| | | |
|---|---|---|
| JP | 2003-195214 | 7/2003 |
| JP | 2004-177709 | 6/2004 |

OTHER PUBLICATIONS

A Cylindrical 3-D Display Observable from All Directions, Tomohiro Endo et al., (1999), English abstract included.

Cylindrical 3-D Display Observable from All Directions, Tomohiro Endo et al., (2001), English abstract included.

Cylindrical 3-D Video Display—Color Video Display System-, Tomohiro Endo et al., (2002), English abstract included.

All-around Autostereoscopic Display for Human Head Imaging, Tomohiro Endo et al., (2007), English abstract included.

A Proposal of Tele-communication system using Symmetric Rotating Camera-Display System, Tomohiro Endo et al., (2007), English abstract included.

SeeLINDER: Cylinderical Three-Dimensional Display Observable from All Directions, Tomohiro Endo et al., (2007), English abstract included.

* cited by examiner

STEREOSCOPIC IMAGE DISPLAY METHOD

TECHNICAL FIELD

The present invention relates to a stereoscopic image display method that eliminates the need for wearing stereoscopic viewing glasses.

BACKGROUND ART

The inventors have proposed a three-dimensional display apparatus which allows many people can simultaneously observe an image by naked eyes in all directions, namely, 360 degrees around the image like a multiplex hologram (refer to Non-Patent Documents 1, 2, and 3). The apparatus is configured in such a manner that one-dimensional light source arrays are composed of one-dimensional light-emitting elements such as LEDs capable of high-speed modulation and vertically arranged in a line, and the light source arrays are rotated inside a cylindrical parallax barrier. This apparatus is characterized by its capability of displaying an image at narrower parallax intervals than ever by rotating the cylindrical parallax barrier in a direction opposite to that of the light source array. As a three-dimensional display apparatus used in carrying out the present invention, it is confirmed that a stereoscopic image can be actually displayed and observed in all directions by this proposed apparatus (refer to Non-patent Document 4).

Japanese Patent Publication No. 2003-195214 (Patent Document 1) has proposed a stereoscopic display system that uses a parallax barrier and a light-emitting array for rotational scanning.

Japanese Patent Publication No. 10-97013 (Patent Document 2) has disclosed another example of a stereoscopic image display system. This stereoscopic image display system uses a three-dimensional display apparatus to present a stereoscopic image, which can be visually recognized by naked eyes, to people located outside the three-dimensional image display apparatus having a cylindrical image display surface or plane defined therein. The image display surface is formed of a plurality of pixels which are respectively configured to emit light of different colors and brightness as defined according to an angle at which the pixel is viewed on a horizontal plane.

Non-Patent Document 1: Tomohiro Endo and Makoto Sato, "Cylindrical Real-Time 3-D Display with Scanned 1-D Light Source Arrays", Journal of the Institute of Image Information and Television Engineers of Japan, Vol. 53, No. 3, pp. 399-404, (1999)

Non-Patent Document 2: Tomohiro Endo, Yoshihiro Kajiki, Toshio Honda, and Makoto Sato, "A Cylindrical 3-D Display Observable from All Directions", 3-D Image Conference '99 Papers, pp. 99-104 (1999)

Non-Patent Document 3: Tomohiro Endo, Yoshihiro Kajiki, Toshio Honda, and Makoto Sato, "Cylindrical 3-D Display Observable from All Directions", Transactions of The Institute of Electronics, Information and Communication Engineers D-II, Vol. J84-D-II, No. 6, pp 1003-1011, (2001)

Non-Patent Document 4: Tomohiro Endo, Toshio Honda, "Cylindrical 3-D Video Display—Color Video Display System—", 3-D Image Conference 2002 Papers, pp. 89-92 (2002)

Patent Document 1: Japanese Patent Publication No. 2003-195214 (Applicant: Seiko Epson Corporation)

Patent Document 2: Japanese Patent Publication No. 10-97013 (Applicant: Futaba Corporation)

DISCLOSURE OF THE INVENTION

Problems to be Solved by the Invention

In the three-dimensional display apparatus described before, the color and brightness of the light emitted by each of the pixels is independently controlled according to an angle in the horizontal direction, or an angle at which the pixel is viewed on a horizontal plane. Display of a stereoscopic image is thereby performed. Accordingly, data to be supplied to the three-dimensional display apparatus is three-dimensional data that specifies the color and brightness of the light, for three parameters, namely, two parameters that identify the position of each pixel and an additional parameter for the angle in the horizontal direction. Generation of the data of a type as described above for displaying a target image will be herein referred to as rendering.

Figure 1:
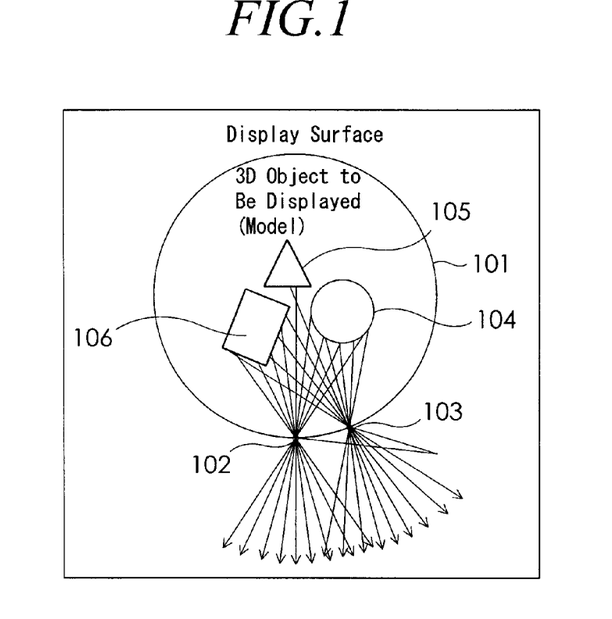
FIG. 1 is an illustration used for explaining a conventional method.

Conventionally, only CG (computer graphics) images are used in stereoscopic display. In other words, the stereoscopic display is performed by so-called model-based rendering which is directly based on a stereoscopic model stored in a computer. In the conventional method of the stereoscopic display, light beams emitted from respective pixels 102, 103 on a screen 101 are traced back from stereoscopic image objects 104 to 106 to be displayed, thereby determining respective colors of the light beams. The three-dimensional data described before is thereby generated. This method is considered to be most readily understood in view of an idea of reproducing a light beam from the object. In the conventional method, however, only the data generated offline from the stereoscopic model within the computer are displayed, and actually photographed images of a person or the like cannot be displayed.

An object of the present invention is to provide a stereoscopic image display method capable of stereoscopic display of an actually photographed image and a pseudo photographed image.

Another object of the present invention is to provide a stereoscopic image display method capable of supporting real time display of an actually photographed image and a pseudo photographed image.

Means for Solving the Problems

When an actually photographed image is handled, information on the image is derived from a plurality of two-dimensional images having parallaxes (which are also referred to as parallax images). When these images are displayed as stereoscopic images, it is necessary to make it possible to selectively view one of the two-dimensional images according to the position of a viewpoint. This is the same as an idea of multi-view autosteroscopic displaying using a lenticular sheet or the like.

In a stereoscopic image display method of the present invention, a three-dimensional display apparatus is used to present a stereoscopic image, which can be visually recognized by naked eyes, to a person located outside the three-dimensional display apparatus having a cylindrical display surface defined therein, wherein the display surface is formed of a plurality of pixels respectively configured to emit light of different color and brightness as defined according to an angle at which the pixel is viewed on a horizontal plane. As the three-dimensional display apparatus as described above, a three-dimensional display apparatus developed by inventors of the present invention, for example, may be employed. The three-dimensional display apparatus developed by the inventors comprises a light-emitting element array structure including a plurality of one-dimensional light-emitting element arrays arranged at predetermined intervals in a circumferential direction of the three-dimensional display apparatus, each of the one-dimensional light-emitting element arrays including a plurality of light-emitting elements longitudinally arranged to form an array; and a light-shielding portion structure arranged outside the light-emitting element array structure, the light shielding portion structure including light-shielding portions arranged at predetermined intervals in the circumferential direction so as to make the light-shielding portion structure have a plurality of slits arranged at predetermined intervals in the circumferential direction. Then, the light-emitting element array structure and the light-shielding portion structure are rotated in mutually opposite directions and timing for light emission of the light-emitting elements included in the one-dimensional light-emitting element arrays is controlled under a condition that a rotational speed of the light-emitting array structure is lower than a rotational speed of the light-shielding portion structure. Thus, the pixels are formed in a space between the light-emitting element array structure and the light-shielding portion structure. Then, the stereoscopic image that can be visually recognized by naked eyes is formed by means of light emitted from the pixels, and is presented to the people outside the display apparatus. In theory, the light-emitting element array structure and the light-shielding portion structure may be rotated in the same direction. When rotating the light-emitting element array structure and the light-shielding portion structure, both of the structures should be rotated with a constant speed ratio. When using a light-emitting element array structure including a plurality of light-emitting elements two-dimensionally arranged on a cylindrical surface in place of the light-emitting element array structure formed of the one-dimensional light-emitting arrays, the light-emitting element array structure may be fixed, and only the light-shielding portion structure may be rotated.

Of course, the method of the present invention may also be applied when other known three-dimensional display apparatuses as disclosed in Japanese Patent Publication No. 10-097013 as well as the three-dimensional display apparatus described above are employed.

In the method of the present invention, a center point of an object to be displayed as the stereoscopic image is defined, and the object is photographed by a photographic device, centering on the center point of the object, in all directions from an outside of the object, thereby obtaining a plurality of two-dimensional images. Alternatively, a plurality of two-dimensional pseudo images, comparable to the two-dimensional images capable of being obtained by photographing the object by the photographic device, centering on the center point of the object, in the all directions from the outside of the object, are created by computer graphics technology, and obtained as the two-dimensional images (a first step). If data processing is performed later, the obtained two-dimensional images are stored in a memory. If the data processing is performed in real-time, the two-dimensional images do not need to be stored in the memory. The center point of the object herein refers to a starting point located on the object side for distance measurement on the object when the object is photographed by the photographic device in all directions from the outside of the object with an equal distance maintained between the photographic device and the object, for example.

Next, one two-dimensional image is selected from among the two-dimensional images, and from among the pixels, one pixel which can be viewed from a viewpoint position corresponding to the selected one two-dimensional image is selected (a second step). The viewpoint position herein refers to a position corresponding to the principal point of lens of the photographic device (camera) that photographed the selected one two-dimensional image when the center point of the object is made to coincide with the cylinder center of the display surface.

Then, an imaginary plane onto which the one two-dimensional image selected is pasted is assumed, and is arranged so that an image center point of the two-dimensional image corresponding to the center point of the object may coincide with the cylinder center of the display surface or the center of a cylindrical space for the cylindrical display surface, and that an angle formed between the virtual surface and a straight line connecting the viewpoint position and the cylinder center of the display surface matches an angle formed between an image pickup surface of the photographic device (camera) and a straight line connecting the center point of the object and the principal point of lens of the photographic device (camera) (a third step). The image center point herein refers to the point at which the center point of the object is located or appears on the two-dimensional image.

Next, an imaginary extended line extending from the viewpoint position to the imaginary plane through the selected one pixel is assumed (a fourth step). A display color of the one pixel as viewed from the viewpoint position is determined based on a color of a point on the two-dimensional image assumed to have been pasted on the imaginary plane, the point corresponding to a point of intersection of the imaginary extended line and the imaginary plane (a fifth step). Most simply, the color of the point, which corresponds to the point of intersection, on the two-dimensional image assumed to have been pasted on the imaginary plane should be determined as the display color of the pixel which is viewed from the viewpoint position. However, in order to inhibit aliasing that may occur when a spatial frequency component higher than the largest spatial frequency that can be displayed by the display apparatus is included in the two-dimensional image assumed to have been pasted on the imaginary plane, it is preferable to perform a weighted average operation to determine the display color of the one pixel according to a distance between the point of intersection and each of neighboring points around the point of intersection, based on the color of the point, corresponding to the point of intersection for the imaginary extended line and the imaginary plane, on the two-dimensional image assumed to have been pasted on the imaginary plane, and colors of points, corresponding to the neighboring points, on the two-dimensional image assumed to have been pasted on the imaginary plane. The largest spatial frequency that can be displayed by the display apparatus is determined according to an interval between adjacent pixels and a discretization interval for the angle in the horizontal direction by which each pixel can control the color and brightness thereof independently.

The second through fifth steps are executed on a plurality of the pixels that can be viewed from the one viewpoint position, thereby determining display colors of the plurality of the pixels (a sixth step). Then, the second through sixth steps are executed on all of the two-dimensional images with respect to all of the viewpoint positions corresponding to these two-dimensional images (a seventh step).

Then, the three-dimensional display apparatus is controlled to change the color of the light emitted from the pixel according to the angle of the emitted light in the horizontal direction, or the angle at which the pixel is viewed on the horizontal plane, so that when the display surface is viewed from the viewpoint positions respectively corresponding to the two-dimensional images, the pixels may respectively have the display colors determined in the first through seventh steps, respectively (an eighth step).

According to the method of the present invention, using the three-dimensional display apparatus with the pixels arranged two-dimensionally on the virtual cylindrical display surface, the two-dimensional image corresponding to each viewpoint position may be independently displayed. Thus, stereoscopic display of an actually photographed image or a pseudo image of the actually photographed image may be performed in real-time.

When the first step and the second through seventh steps are executed in real-time, an actually photographed image may be displayed in real-time.

The light-emitting elements included in the light-emitting element arrays typically include light-emitting diodes, laser diodes, organic ELs, plasma display elements, FEDs, SEDs, and CRTs, and also include a combination of a spatial light modulator such as a liquid crystal display device and DMD device, and an appropriate light source.

BEST MODE FOR CARRYING OUT THE INVENTION

An embodiment of a stereoscopic image display method according to the present invention will be described below in detail with reference to the accompanying drawings.

Figure 2:
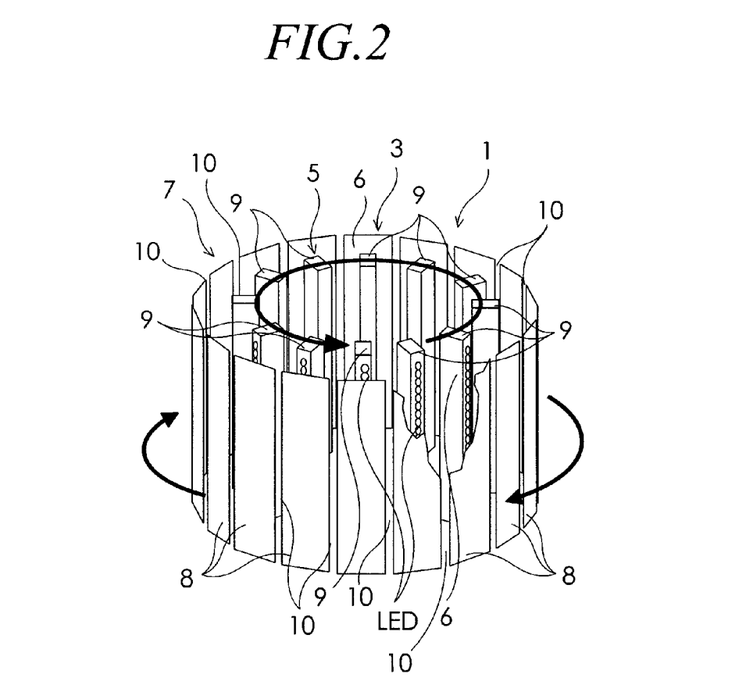
FIG. 2 is an illustration showing a basic structure of a three-dimensional display apparatus used in an embodiment of the present invention.

FIG. 2 shows a basic structure of a three-dimensional display apparatus 1 used in this embodiment of the present invention. This three-dimensional display apparatus 1 comprises a composite rotational structure 3. The composite rotational structure 3 comprises a light-emitting element array structure 5 and a light-shielding portion structure 7. The light-emitting array structure 5 includes a plurality of one-dimensional light-emitting element arrays 9 that are arranged in a circumferential direction of the light-emitting array structure at predetermined intervals. Each one-dimensional light-emitting element array 9 includes a plurality of light-emitting diode LEDs that are attached to a supporting member and are longitudinally (or vertically) arranged to form arrays on the supporting member. In this embodiment, each of the one-dimensional light-emitting arrays 9 that constitute the light-emitting element array structure 5 has monochrome light-emitting diodes that arranged in the vertical direction. Three types of the one-dimensional light-emitting element arrays, namely, of red, green, and blue colors are arranged recurrently in the circumferential direction, thereby constituting the light-emitting element array structure 5. The one-dimensional light-emitting element array may also be constituted from a plurality of light-emitting elements that are longitudinally arranged, and each of which includes light emitters of the three colors, red, green, and blue in one package. The one-dimensional light-emitting element arrays 9 are coupled by thin, ring-shaped coupling frames (not shown) arranged respectively at upper and lower positions of the one-dimensional light-emitting element arrays 9.

The light-shielding portion structure 7 referred to as a parallax barrier is arranged outside the light-emitting element array structure 5, and includes a plurality of light-shielding portions 8 arranged in the circumferential direction at predetermined intervals to form a plurality of slits 10 that allow people located outside the image display apparatus 1 to view a stereoscopic image. The light-emitting element array structure 5 and the light-shielding portion structure 7 are rotated with a constant speed ratio. Provided that the light-emitting element array structure 5 and the light-shielding portion structure 7 are rotated with the constant speed ratio, rotational directions of the light-emitting element array structure 5 and the light-shielding portion structure 7 may be opposite to each other, as shown in FIG. 2, or the rotational directions may be the same. A description of a driving structure for rotating the light-emitting element array structure 5 and the light-shielding portion structure 7 is omitted.

Some of inventors have already disclosed a basic principle of the three-dimensional display apparatus 1 used in this embodiment as described in "Cylindrical 3-D Display using rotating one-dimensional light source arrays and a cylindrical parallax barrier" (by Tomohiro Endo, Yoshihiro Kajiki, Toshio Honda, Makoto Sato, "All-Around Type Three-Dimensional Display", Transactions of The Institute of Electronics, Information and Communication Engineers Vol. J84-D-II, No. 6, pp 1003-1011, 2001). A disclosed prototype apparatus can display different images at a narrow interval of one degree. An operational principle of the prototype apparatus is as follows. Both of the light-shielding portion structure (parallax barrier) 7 and the light-emitting element structure 5 located inside the light-shielding portion structure 7 are rotated together. The rotational directions are opposite. By rotation of the one-dimensional light-emitting elements 9 disposed in the light-emitting element array structure 5, an image may be displayed on a cylindrical display surface. By rotation of both of the light-emitting element array structure 5 and the light-shielding portion structure (parallax barrier) 7, a relative position between the light-emitting element array structure 5 and the light-shielding portion structure 7 changes at a high speed. Accordingly, an orientation of thin luminous flux that passes through a slit 10 of the light-shielding portion structure 7 is scanned. Then, by changing brightness of each of the light-emitting diode elements LEDs that constitute the one-dimensional light-emitting element arrays in synchronization with the scanning, light beam reproduction is performed by time division. As a result, an image (stereoscopic image) that is differently viewed depending upon a viewing direction may be shown.

The specification of the three-dimensional display apparatus 1 used in this embodiment is as shown in Table 1.

TABLE 1

| | |
|---|---|
| Pixel Pitch | 1 [mm] |
| No. of Pixels | 1254 (H) × 256 (V) |
| Viewing Area Angle | 360 degrees |
| | (60 degrees per pixel) |

TABLE 1-continued

| | |
|---|---|
| Light Beam Angular Interval | 1 degree |
| Stereoscopic Image Size | F200 × 256 [mm] |
| No. of Colors | 4096 (12 bits) |
| Frame Memory Capacity | 6.9 GB |
| Video Length | 5.4 [s] |
| Dimension of Apparatus | 800 W × 800 D × 1100 H [mm] |

Specifically, the light-shielding portion structure (parallax barrier) 7 of the prototype apparatus rotates at a high speed of 1800 rpm, for example. On contrast therewith, the light-emitting element array structure 5 of the prototype apparatus rotates at a speed of 100 rpm.

Figure 3:
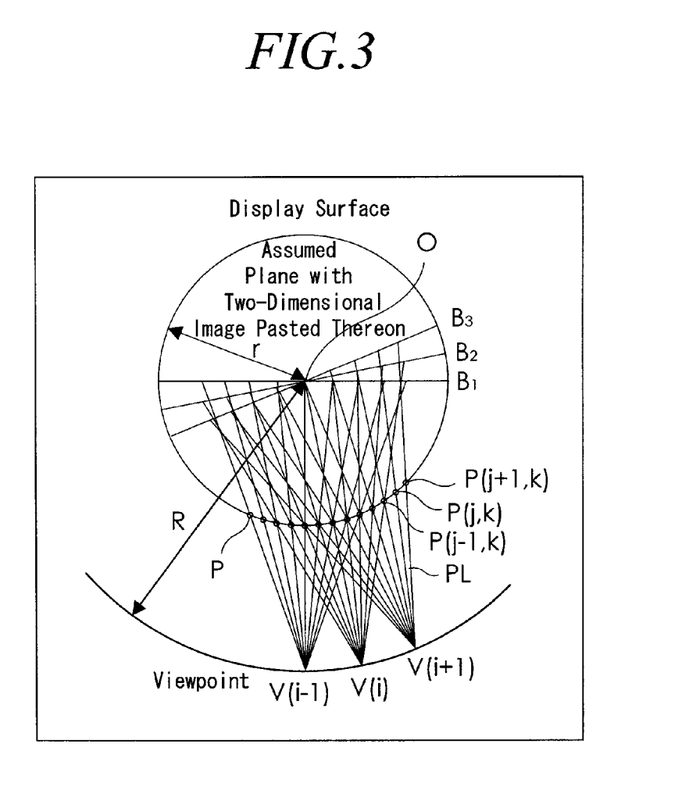
FIG. 3 is an illustration used for explaining the principle of a method of the present invention.
Figure 4:
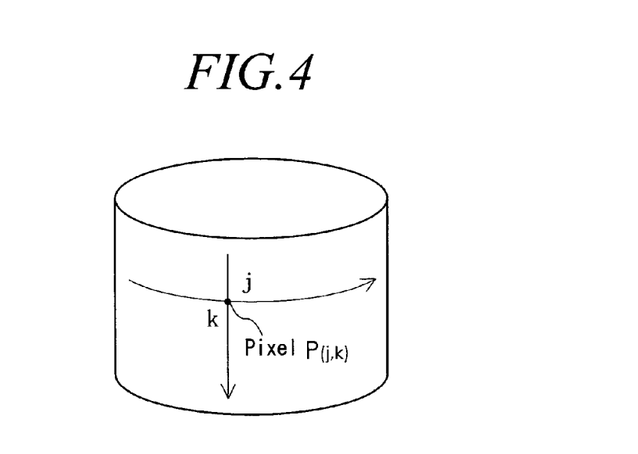
FIG. 4 is an illustration showing how to identify a pixel when explaining the principle of the method of the present invention with reference to FIG. 3.
Figure 5:
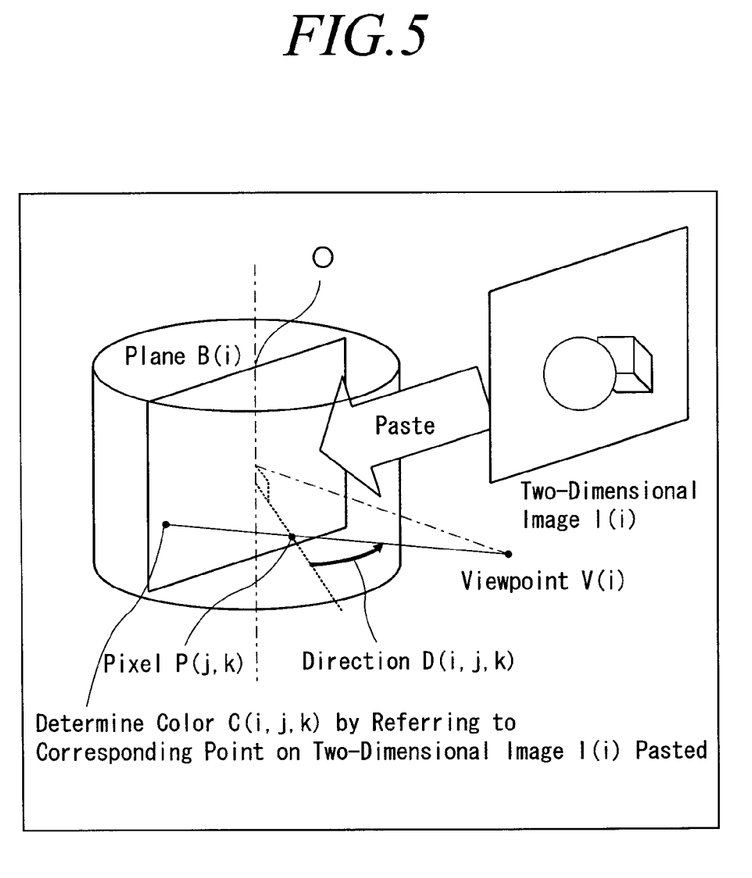
FIG. 5 is an illustration supplementarily used when explaining the principle of the method of the present invention with reference to FIG. 3.

In the stereoscopic image display method of the present invention, the three-dimensional display apparatus 1 as described above is used, thereby performing stereoscopic display in a manner that will be described below. A rendering method for carrying out the method of the present invention will be described with reference to FIGS. 3 through 5. It is assumed herein that the three-dimensional display apparatus 1 has a two-dimensional arrangement of pixels on a cylindrical surface (cylindrical display surface), constituted by one pixel in a circumferential direction of the apparatus and m pixels in an axis direction of the apparatus. A pixel is indicated by P(j, k). As shown in FIG. 4, the first subscript of P indicates a position in the circumferential direction, and the second subscript of P indicates a position in the axis direction of a cylinder. Accordingly, all pixels are represented by P(1, 1) through P(1, m).

First, a center point of an object to be displayed as a stereoscopic image is defined, and the object is photographed by a photographic device (camera), centering on the center point of the object, in all directions around or from an outside of the object, thereby obtaining a plurality of two-dimensional images. Alternatively, a plurality of two-dimensional pseudo images comparable to the two-dimensional images that can be obtained by defining the center of the object and photographing the object by the photographic device, centering on the center of the object, in the all directions around or from the outside of the object, are created by computer graphics technology, and these images are used as the two-dimensional images (a first step). These two-dimensional images are stored in a memory as image data that can be processed by a computer. When the two-dimensional images are actually photographed images, inputs to the three-dimensional display apparatus 1 are n two-dimensional images photographed by the camera, or the actually photographed images, which are indicated by I(1) to I(n). In this case, photographing may be performed using only one camera, or a plurality of cameras. A type of the camera is arbitrary. In view of the subsequent data processing, it is preferable that photographing is performed by a digital camera.

Next, one two-dimensional image I(i) is selected from among the stored two-dimensional images [I(1) to I(n)], and one pixel P(j, k) that can be viewed or seen from a viewpoint position V(i) corresponding to the image I(i) is selected from pixels P(j, k) (a second step). The viewpoint position (Vi) herein refers to a position corresponding to the principal point of lens of the camera that photographed the two-dimensional image I(i) when the center point of the object is made to coincide with a cylinder center O. When a magnification is different between when the two-dimensional image was actually photographed and when stereoscopic display is performed, the position V(i) should be changed according to the magnification.

Next, an imaginary plane B(i) with the selected two-dimensional image I(i) pasted thereon is assumed, and the imaginary plane B(i) is arranged so that an image center point of the two-dimensional image I(i) corresponding to the center point of the object coincides with the center of the cylindrical display surface or the cylinder center O, and that an angle formed between a straight line connecting the viewpoint position V(i) and the cylinder center O and the imaginary plane B(i) matches an angle formed between a straight line connecting the center point of the object and the principal point of lens of the camera and an image pickup surface of the camera (a third step).

Next, an imaginary extended line PL that extends from the viewpoint position V(i) to the imaginary plane B(i) through the selected one pixel P(j, k) is assumed (a fourth step). Actually data are manipulated to make these assumptions, using the computer. When an image formation surface obtained at the time of photographing is a curved surface or a polyhedron, which is not a simple plane, the imaginary plane B(i) may also be formed to be the curved surface or other shape the like in accordance with the image formation surface. The imaginary plane B(i) in this case is arranged in an appropriate position relative to the viewpoint position V(i) in accordance with a photographing situation.

Next, a display color C(i, j, k) of one pixel P(j, k) as viewed in a direction D(i, j, k) from the viewpoint position V(i) is determined, based on a color of a point on the two-dimensional image assumed to have been pasted on the imaginary plane B(i), the point corresponding to a point of intersection of the imaginary extended line PL and the imaginary plane B(i) (a fifth step). In theory, the color of a point, which corresponds to the point of intersection, on the two-dimensional image assumed to have been pasted on the imaginary plane B(i), should be determined as the display color C(i, j, k) for the one pixel P(j, k) as viewed in the direction D(i, j, k) from the viewpoint position V(i). However, when a spatial frequency component higher than the largest spatial frequency that can be displayed by the display apparatus is included, aliasing may occur in the two-dimensional image I(i) assumed to have been pasted on the imaginary plane. Then, in order to control aliasing, it is preferable to perform a weighted average operation to determine the display color C(i, j, k) of one pixel according to a distance between the point of intersection and each of neighboring points around the point of intersection, based on the color of the point, corresponding to the point of intersection for the imaginary extended line and the imaginary plane, on the two-dimensional image assumed to have been pasted on the imaginary plane, and colors of points, corresponding to the neighboring points, on the two-dimensional image assumed to have been pasted on the imaginary plane. When the weighted average operation as described above is performed, the maximum value of the spatial frequency of the two-dimensional image I(i) may be substantially limited. Occurrence of aliasing can be thereby controlled.

The largest spatial frequency that can be displayed by the display apparatus is determined based on a pixel interval and a discretization interval of an angle in the horizontal direction by which each pixel can control the color and brightness of the pixel independently.

Figure 6:
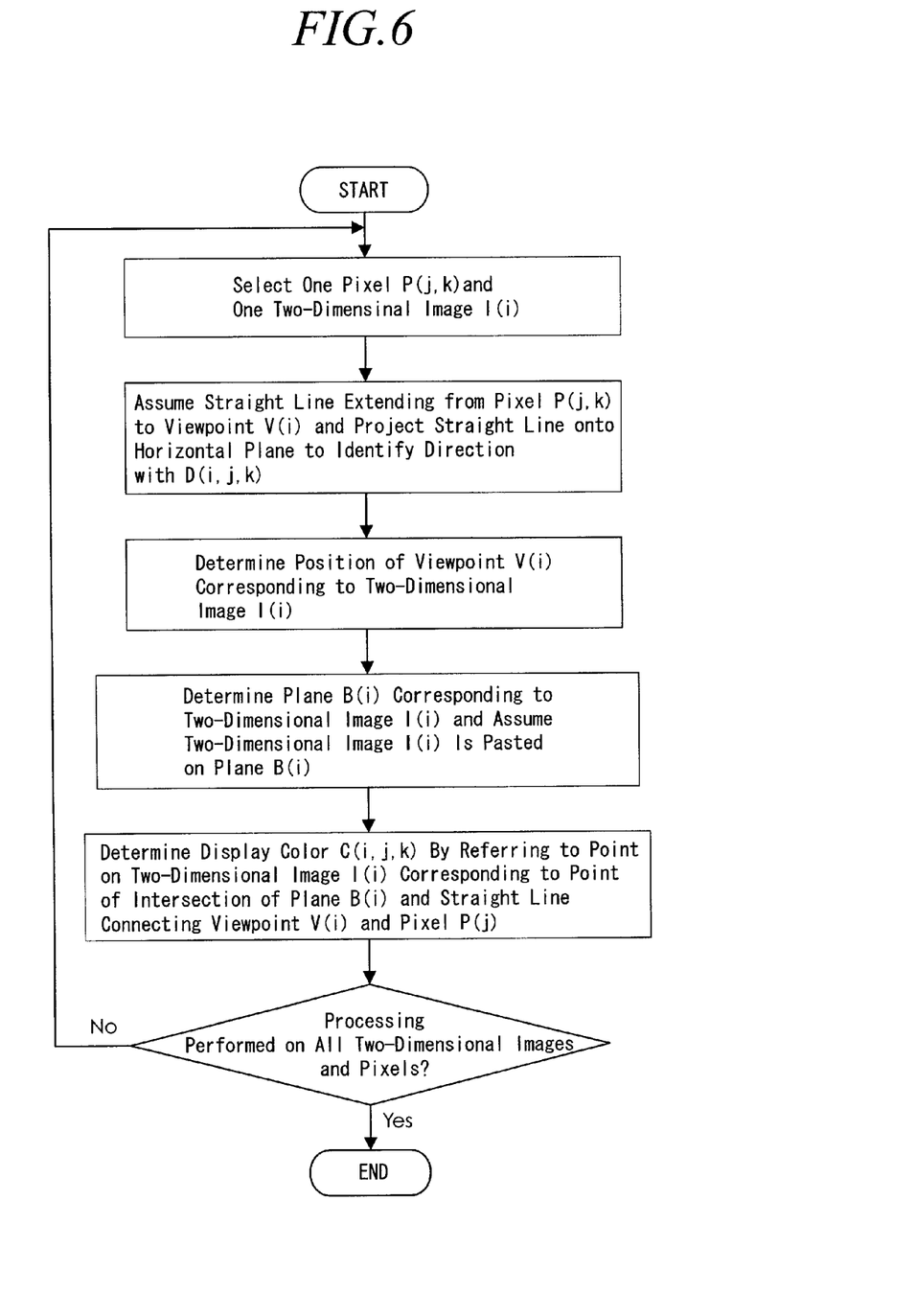
FIG. 6 is a flowchart showing an example of a software algorithm used to implement using a computer the second through eighth steps of the method according to the embodiment of the present invention.

The second through fifth steps are executed on a plurality of pixels P that can be viewed or seen from the one viewpoint position V(i), thereby determining display colors of the pixels P (a sixth step). Then, the second through sixth steps are executed on all of the two-dimensional images with respect to all of the viewpoint positions V(i) corresponding to these two-dimensional images (a seventh step). Then, timing for light emission for the light-emitting elements LEDs included in the one-dimensional light-emitting element arrays 9 is controlled so that when the display surface is viewed from the viewpoint positions, all the pixels have the display colors determined in the first through seventh steps (an eighth step). In other words, the three-dimensional display apparatus is controlled to change the color of light emitted from each of the light-emitting elements LEDs according to the angle of the emitted light in the horizontal direction or the angle at which the pixel is viewed from the viewpoint position on the horizontal plane, so that when the display surface is viewed from the viewpoint positions respectively corresponding to the two-dimensional images, the pixels may respectively have the display colors determined in the first through seventh steps. The light-emitting elements LEDs are driven by a light-emitting element driving device not shown. FIG. 6 is a flowchart showing an example of a software algorithm used to implement using a computer the second through eighth steps described above.

INDUSTRIAL APPLICABILITY

According to the method of the present invention, it is possible to implement stereoscopic image display of an actually photographed image or pseudo photographed image using a three-dimensional display apparatus, wherein people outside the display apparatus may visually recognize the stereoscopic image by naked eyes as viewed in all directions. The display apparatus has a cylindrical display surface defined therein, which are formed of a plurality of pixels respectively configured to emit light of different color and brightness as defined an angle of the emitted light in the horizontal direction or an angle at which the pixel is viewed from the viewpoint position on a horizontal plane.

The invention claimed is:

1. A stereoscopic image display method that uses a three-dimensional display apparatus to present a stereoscopic image, which can be visually recognized by naked eyes, to a person located outside the three-dimensional display apparatus having a cylindrical display surface defined therein, the display surface being formed of a plurality of pixels respectively configured to emit light of different color and brightness as defined according to an angle at which the pixel is viewed on a horizontal plane, the method comprising:
    a first step of defining a center point of an object to be displayed as the stereoscopic image, and photographing the object by a photographic device in all directions from an outside of the object, centering on the center point of the object to thereby obtain a plurality of two-dimensional images, or creating by computer graphics technology a plurality of two-dimensional pseudo images comparable to the two-dimensional images to be obtained by photographing the object from the all directions from the outside of the object, centering on the center point of the object, and using the two-dimensional pseudo images as the two-dimensional images;
    a second step of selecting from among the two-dimensional images one two-dimensional image and selecting from among the pixels one pixel which can be viewed from a viewpoint position corresponding to the one two-dimensional image which has been selected;
    a third step of defining an imaginary plane onto which the one two-dimensional image selected is pasted, and arranging the imaginary plane so that an image center point of the one two-dimensional image corresponding to the center point of the object may coincide with the center of a cylindrical space for the cylindrical display surface and that an angle formed between the imaginary plane and a straight line connecting the viewpoint position and the center of the cylindrical space for the cylindrical display surface matches an angle formed between an image pickup surface of the photographic device and a straight line connecting the center point of the object and a principal point of the lens of the photographic device;
    a fourth step of defining an imaginary extended line which extends from the viewpoint position to the imaginary plane through the one pixel selected;
    a fifth step of determining a display color of the one pixel as viewed from the viewpoint position, based on a color of a point on the two-dimensional image defined to have been pasted on the imaginary plane, the point corresponding to a point of intersection of the imaginary extended line and the imaginary plane;
    a sixth step of executing the second through fifth steps on the plurality of pixels which can be viewed from the viewpoint position to thereby determine display colors of the plurality of pixels;
    a seventh step of executing the second through sixth steps on all of the plurality of two-dimensional images; and
    an eighth step of controlling the three-dimensional display apparatus to change the color of the light emitted from the pixel according to the angle at which the pixel is viewed on the horizontal plane, so that when the display surface is viewed from the viewpoint positions respectively corresponding to the two-dimensional images, the pixels may respectively have the display colors determined in the first through seventh steps, wherein
    the second through eighth steps are implemented using a computer.

2. The stereoscopic image display method according to claim 1, wherein the three-dimensional display apparatus comprises:
    a light-emitting element array structure including a plurality of one-dimensional light-emitting element arrays arranged at predetermined intervals in a circumferential direction of the three-dimensional display apparatus, one-dimensional light-emitting element arrays each including a plurality of light-emitting elements longitudinally arranged to form an array; and
    a light-shielding portion structure arranged outside the light-emitting element array structure, the light shielding portion structure including a plurality of light-shielding portions arranged at predetermined intervals in the circumferential direction so as to make the light-shield portion structure have a plurality of slits arranged at predetermined intervals in the circumferential direction; and
    wherein the light-emitting element array structure and the light-shielding portion structure are rotated in mutually opposite directions, and light emission of the light-emitting elements included in the one-dimensional light-emitting element arrays is controlled, to thereby form the display surface formed of the pixels in a space between the light-emitting element array structure and the light-shielding portion structure.

3. The stereoscopic image display method according to claim 1, wherein the first step and the second through seventh steps are executed in real-time.

4. The stereoscopic image display method according to claim 1, wherein when an image formation surface of the two-dimensional image is not a simple plane, the imaginary plane is defined as having the same shape as the image formation surface.

5. The stereoscopic image display method according to claim 1, wherein in the fifth step, a weighted average operation is performed to determine the display color of the one pixel according to a distance between the point of intersection and each of neighboring points around the point of intersection, based on the color of the point, corresponding to the point of intersection for the imaginary extended line and the imaginary plane, on the two-dimensional image assumed to have been pasted on the imaginary plane, and colors of points, corresponding to the neighboring points, on the two-dimensional image assumed to have been pasted on the imaginary plane.

6. The stereoscopic image display method according to claim 5, wherein the three-dimensional display apparatus comprises:
- a light-emitting element array structure including a plurality of one-dimensional light-emitting element arrays arranged at predetermined intervals in a circumferential direction of the three-dimensional display apparatus, one-dimensional light-emitting element arrays each including a plurality of light-emitting elements longitudinally arranged to form an array; and
- a light-shielding portion structure arranged outside the light-emitting element array structure, the light shielding portion structure including a plurality of light-shielding portions arranged at predetermined intervals in the circumferential direction so as to make the light-shield portion structure have a plurality of slits arranged at predetermined intervals in the circumferential direction; and
- wherein the light-emitting element array structure and the light-shielding portion structure are rotated in mutually opposite directions, and light emission of the light-emitting elements included in the one-dimensional light-emitting element arrays are controlled, to thereby form the display surface formed of the pixels in a space between the light-emitting element array structure and the light-shielding portion structure.

7. The stereoscopic image display method according to claim 5, wherein the first step and the second through seventh steps are executed in real-time.

8. A stereoscopic image display method that uses a three-dimensional display apparatus to present a stereoscopic image, which can be visually recognized by naked eyes, to a person located outside the three-dimensional display apparatus,
the three-dimensional display apparatus comprising:
- a light-emitting element array structure including a plurality of one-dimensional light-emitting element arrays arranged at predetermined intervals in a circumferential direction of the three-dimensional display apparatus, one-dimensional light-emitting element arrays each including a plurality of light-emitting elements longitudinally arranged to form an array; and
- a light-shielding portion structure arranged outside the light-emitting element array structure, the light shielding portion structure including a plurality of light-shielding portions arranged at predetermined intervals in the circumferential direction so as to make the light-shield portion structure have a plurality of slits arranged at predetermined intervals in the circumferential direction,
the three-dimensional display apparatus having a cylindrical display surface formed of a plurality of pixels, the display surface being defined by rotating the light-emitting element array structure and the light-shielding portion structure at a constant rotational speed ratio, and controlling light emission of the light-emitting elements included in the one-dimensional light-emitting element arrays, the method comprising:
- a first step of defining a center point of an object to be displayed as the stereoscopic image, and photographing the object by a photographic device in all directions from an outside of the object, centering on the center point of the object to thereby obtain a plurality of two-dimensional images, or creating by computer graphics technology a plurality of two-dimensional pseudo images comparable to the two-dimensional images to be obtained by photographing the object from the all directions from the outside of the object, centering on the center point of the object, and using the two-dimensional pseudo images as the two-dimensional images;
- a second step of selecting from among the two-dimensional images one two-dimensional image and selecting from among the pixels one pixel which can be viewed from a viewpoint position corresponding to the one two-dimensional image which has been selected;
- a third step of defining an imaginary plane onto which the one two-dimensional image selected is pasted, and arranging the imaginary plane so that an image center point of the one two-dimensional image corresponding to the center point of the object may coincide with the center of a cylindrical space for the cylindrical display surface and that an angle formed between the imaginary plane and a straight line connecting the viewpoint position and the center of the cylindrical space for the cylindrical display surface matches an angle formed between an image pickup surface of the photographic device and a straight line connecting the center point of the object and a lens's principal point of the photographic device;
- a fourth step of defining an imaginary extended line which extends from the viewpoint position to the imaginary plane through the one pixel selected;
- a fifth step of determining a display color of the one pixel as viewed from the viewpoint position, based on a color of a point on the two-dimensional image defined to have been pasted on the imaginary plane, the point corresponding to a point of intersection of the imaginary extended line and the imaginary plane;
- a sixth step of executing the second through fifth steps on the plurality of pixels which can be viewed from the viewpoint position to thereby determine display colors of the plurality of pixels;
- a seventh step of executing the second through sixth steps on all of the plurality of two-dimensional images; and
- an eighth step of controlling the three-dimensional display apparatus to change the color of the light emitted from the pixel according to the angle at which the pixel is viewed on the horizontal plane, so that when the display surface is viewed from the viewpoint positions respectively corresponding to the two-dimensional images, the pixels may respectively have the display colors determined in the first through seventh steps, wherein
the second through eighth steps are implemented using a computer.

9. A stereoscopic image display method that uses a three-dimensional display apparatus to present a stereoscopic image, which can be visually recognized by naked eyes, to a person located outside the three-dimensional display apparatus,
the three-dimensional display apparatus comprising:
- a light-emitting element array structure including a plurality of light-emitting elements two-dimensionally arranged on a cylindrical surface; and a light-shielding portion structure arranged outside the light-emitting element array structure, the light shielding portion structure including a plurality of light-shielding portions arranged at predetermined intervals in a circumferential direction so as to make the light-shield portion structure have a plurality of slits arranged at predetermined intervals in the circumferential direction, the three-dimensional display apparatus having a cylindrical display surface formed of a plurality of pixels, the display surface being defined by rotating the light-emitting element array structure and controlling light emission of the light-emitting elements included in the light-emitting element array structure, the method comprising:

a first step of defining a center point of an object to be displayed as the stereoscopic image, and photographing the object by a photographic device in all directions from an outside of the object, centering on the center point of the object to thereby obtain a plurality of two-dimensional images, or creating by computer graphics technology a plurality of two-dimensional pseudo images comparable to the two-dimensional images to be obtained by photographing the object from the all directions from the outside of the object, centering on the center point of the object, and using the two-dimensional pseudo images as the two-dimensional images;

a second step of selecting from among the two-dimensional images one two-dimensional image and selecting from among the pixels one pixel which can be viewed from a viewpoint position corresponding to the one two-dimensional image which has been selected;

a third step of defining an imaginary plane onto which the one two-dimensional image selected is pasted, and arranging the imaginary plane so that an image center point of the one two-dimensional image corresponding to the center point of the object may coincide with the center of a cylindrical space for the cylindrical display surface and that an angle formed between the imaginary plane and a straight line connecting the viewpoint position and the center of the cylindrical space for the cylindrical display surface matches an angle formed between an image pickup surface of the photographic device and a straight line connecting the center point of the object and a lens's principal point of the photographic device;

a fourth step of defining an imaginary extended line which extends from the viewpoint position to the imaginary plane through the one pixel selected;

a fifth step of determining a display color of the one pixel as viewed from the viewpoint position, based on a color of a point on the two-dimensional image defined to have been pasted on the imaginary plane, the point corresponding to a point of intersection of the imaginary extended line and the imaginary plane;

a sixth step of executing the second through fifth steps on the plurality of pixels which can be viewed from the viewpoint position to thereby determine display colors of the plurality of pixels;

a seventh step of executing the second through sixth steps on all of the plurality of two-dimensional images; and an eighth step of controlling the three-dimensional display apparatus to change the color of the light emitted from the pixel according to the angle at which the pixel is viewed on the horizontal plane, so that when the display surface is viewed from the viewpoint positions respectively corresponding to the two-dimensional images, the pixels may respectively have the display colors determined in the first through seventh steps, wherein the second through eighth steps are implemented using a computer.

* * * * *